United States Patent
Gao et al.

(10) Patent No.: US 11,349,534 B2
(45) Date of Patent: May 31, 2022

(54) MULTI-TRP CODEBOOK

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/257,787

(22) PCT Filed: Jul. 6, 2018

(86) PCT No.: PCT/CN2018/094841
§ 371 (c)(1),
(2) Date: Jan. 4, 2021

(87) PCT Pub. No.: WO2020/006755
PCT Pub. Date: Jan. 9, 2020

(65) Prior Publication Data
US 2021/0273692 A1 Sep. 2, 2021

(51) Int. Cl.
*H04B 7/0456* (2017.01)
*H04B 17/309* (2015.01)
*H04B 7/06* (2006.01)

(52) U.S. Cl.
CPC ......... *H04B 7/0456* (2013.01); *H04B 7/0695* (2013.01); *H04B 17/309* (2015.01)

(58) Field of Classification Search
CPC .. H04B 7/0456; H04B 17/309; H04B 7/0695; H04B 7/024
See application file for complete search history.

(56) References Cited

U.S. PATENT DOCUMENTS

| 10,389,422 B2 * | 8/2019 | Muruganathan | H04B 7/0617 |
| 2011/0305263 A1 * | 12/2011 | Jöngren | H04B 7/0617 375/219 |

(Continued)

FOREIGN PATENT DOCUMENTS

| WO | 2012/093742 A1 | 7/2012 |
| WO | 2012/110863 A1 | 8/2012 |

(Continued)

OTHER PUBLICATIONS

"CSI enhancements for CS/CB with FD-MIMO", Huawei, HiSilicon, 3GPP TSG RAN WG1 Meeting #87, R1-1611179, Reno, USA, Nov. 2016, 3 pages.

(Continued)

*Primary Examiner* — Kenneth T Lam
(74) *Attorney, Agent, or Firm* — Sughrue Mion, PLLC

(57) ABSTRACT

Embodiments of the present disclosure provide a method, a device and a computer readable medium for communication based on a multi-TRP codebook. According to a method for communication, a terminal device measures downlink channel conditions related to a plurality of network devices in communication with the terminal device. The terminal device selects a precoding matrix from a codebook based on the downlink channel conditions, elements in a column of the codebook represent respective beam sets for the plurality of network devices, and the precoding matrix indicates respective beams for the plurality of network devices. The terminal device transmits an index of the precoding matrix to at least one of the plurality of network devices. The embodiments of the present disclosure enable multi-TRP PMI feedback based on the proposed multi-TRP codebook.

20 Claims, 3 Drawing Sheets

(56) References Cited

U.S. PATENT DOCUMENTS

| | | | | |
|---|---|---|---|---|
| 2014/0301492 A1* | 10/2014 | Xin | ...................... | H04B 7/0456 |
| | | | | 375/267 |
| 2017/0288751 A1* | 10/2017 | Faxer | ................... | H04B 7/0456 |
| 2018/0083676 A1* | 3/2018 | Wei | ...................... | H04B 7/0478 |
| 2018/0167117 A1* | 6/2018 | Liu | ........................ | H04B 7/063 |
| 2021/0143870 A1* | 5/2021 | Faxer | ................... | H04B 7/0697 |

FOREIGN PATENT DOCUMENTS

| | | |
|---|---|---|
| WO | 2012/131612 A1 | 10/2012 |
| WO | 2014/038832 A1 | 3/2014 |

OTHER PUBLICATIONS

International Search Report for PCT/CN2018/094841 dated Mar. 29, 2019.

Written Opinion for PCT/CN2018/094841 dated Mar. 29, 2019.

\* cited by examiner

MULTI-TRP CODEBOOK

CROSS-REFERENCE TO RELATED APPLICATIONS

This application is a National Stage of International Application No. PCT/CN2018/094841 filed Jul. 6, 2018.

FIELD

Embodiments of the present disclosure generally relate to wireless communication, and in particular, to a method, a device and a computer readable medium for communication based on a multi-TRP codebook.

BACKGROUND

The latest developments of the 3GPP standards are referred to as Long Term Evolution (LTE) of Evolved Packet Core (EPC) network and Evolved UMTS Terrestrial Radio Access Network (E-UTRAN), also commonly termed as '4G'. In addition, the term '5G New Radio (NR)' refers to an evolving communication technology that is expected to support a variety of applications and services. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard.

Recently, the study of NR system was approved. The NR will consider frequency ranges up to 100 GHz with the objective of a single technical framework addressing all defined usage scenarios, requirements and deployment scenarios, including enhanced mobile broadband, massive machine-type-communications, and ultra-reliable and low latency communications. Discussion of multi-antenna scheme for new radio access has been started, including multi-antenna scheme, beam management, channel state information (CSI) acquisition, and reference signal and quasi co-located (QCL). Also, single-TRP transmission and multi-TRP transmission have been agreed in NR. However, multi-TRP/panel transmission is down-prioritized in current study, and will be discussed in future developments.

SUMMARY

In general, example embodiments of the present disclosure provide a method, a device and a computer readable medium for communication based on a multi-TRP codebook.

In a first aspect, there is provided a method for communication. The method comprises measuring downlink channel conditions related to a plurality of network devices in communication with a terminal device. The method also comprises selecting a precoding matrix from a codebook based on the downlink channel conditions, elements in a column of the codebook representing respective beam sets for the plurality of network devices, the precoding matrix indicating respective beams for the plurality of network devices. The method further comprises transmitting an index of the precoding matrix to at least one of the plurality of network devices.

In a second aspect, there is provided a terminal device. The terminal device comprises a processor and a memory storing instructions. The memory and the instructions are configured, with the processor, to cause the terminal device to measure downlink channel conditions related to a plurality of network devices in communication with a terminal device. The memory and the instructions are also configured, with the processor, to cause the terminal device to select a precoding matrix from a codebook based on the downlink channel conditions, elements in a column of the codebook representing respective beam sets for the plurality of network devices, the precoding matrix indicating respective beams for the plurality of network devices. The memory and the instructions are further configured, with the processor, to cause the terminal device to transmit an index of the precoding matrix to at least one of the plurality of network devices.

In a third aspect, there is provided a computer readable medium having instructions stored thereon. The instructions, when executed on at least one processor of a device, cause the device to carry out the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
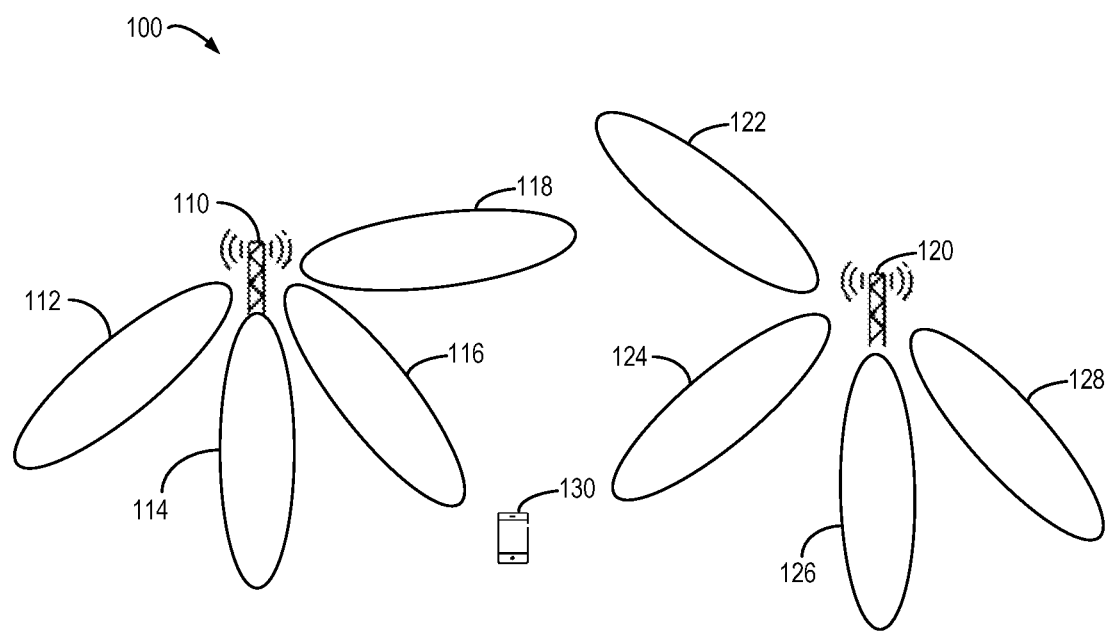
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "transmission/reception point" may generally indicate a station communicating with the user equipment. However, the transmission/reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission/reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 is a block diagram of a communication environment 100 in which embodiments of the present disclosure can be implemented. In the communication environment 100, there are two network devices 110, 120 and a terminal device 130. The terminal device 130 may communicate with one or both of the network devices 110, 120 via wireless communication links. It is to be understood that the number of network devices and the number of terminal devices are only for the purpose of illustration without suggesting any limitations. The communication environment 100 may include any suitable number of network devices and terminal devices adapted for implementing embodiments of the present disclosure.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As mentioned above, the terminal device 130 may communicate with one or both of the network devices 110, 120 via transmissions on the forward and reverse links. As used herein, the forward link (or downlink) refers to the communication link from the access networks to the terminals, and the reverse link (or uplink) refers to the communication link from the terminals to the access networks. These communication links may be established via a single-in-single-out, multiple-in-signal-out or a multiple-in-multiple-out (MIMO) system.

A MIMO system employs multiple transmit antennas and multiple receive antennas for data transmission. A MIMO channel formed by the transmit and receive antennas may be decomposed into a plurality of independent channels, which are also referred to as spatial channels. Each of these independent channels corresponds to a spatial dimension. The MIMO system can provide improved performance (e.g., higher peak rates and/or coverage) if the additional dimensionalities created by the multiple transmit and receive antennas are utilized.

One of the MIMO technologies that have been used in cellular systems is closed loop transmit precoding. In communication environment 100, it is assumed that the network devices 110, 120 and the terminal device 130 support the closed loop transmit precoding. The network devices 110, 120 can switch among their respective beams to adapt changes in conditions caused by movement of the terminal device 130, or variation in environmental conditions within a cell.

For example, the network device 110 may use one or more of its four beams 112, 114, 116, and 118 to communicate with the terminal device 130. Analogously, the network device 120 may use one or more of its four beams 122, 124, 126, and 128 to communicate with the terminal device 130. This process may also be referred to as beamforming. It is to be understood that the particular number of beams for network devices 110, 120 is only for the purpose of illustration without suggesting any limitations. The network devices 110, 120 may have any same or different numbers of beams in other embodiments.

Taking the network device 110 as an example, when performing beamforming, channel state information (CSI) is obtained at the network device 110 and is used to precode data before being modulated and transmitted from antennas of the network device 110. The network device 110 transmits downlink (DL) reference signal(s) from its designated antenna ports which are used by the terminal device 130 to calculate CSI. The CSI is then encoded and fed back to the network device 110 using either an UL control channel or by multiplexing on an UL data channel. At the network device 110, the received feedback CSI information is decoded and used to calculate precoding information. This precoding information is then applied to the DL data channel before transmission from the antenna ports.

In codebook-based implicit feedback schemes, the terminal device 130 and the network device 110 generally use a common or shared codebook. The terminal device 130 would ideally search over the shared codebook on all possible ranks and associated precoding matrices for each rank, that best represents the channel based upon the reference signal measurement, or that gives the maximum received signal. Then the terminal device 130 feeds back the selected rank as a rank indicator (RI) and the index of the selected precoding matrix within the codebook of the selected rank, referred to as a precoding matrix index (PMI).

At the network device 110, the RI and the PMI are used to select the precoding matrix from the shared codebook. The network device 110 will then use CQI and the obtained PMI, possibly along with other feedback information (for example HARQ) and other measurements to decide the transmit precoding to use for the incoming DL data transmission. In the example scenario of FIG. 1, it is assumed that each transmission beam 112-118 corresponds to a different precoding matrix.

In 5G wireless communications, massive MIMO is one of the key enabling technologies. A large number of antenna elements bring extra degrees of freedom for increasing the throughput and considerable beamforming gains for improving the coverage. In practice, a large number of antenna elements can be assembled into multiple antenna panels for the purpose of cost reduction and power saving. Currently, the 3GPP specifications define the codebook represents a same beam for different panels of a network device, a column of the codebook may be written as below.

$$W_{l,m,p,n} = \begin{bmatrix} v_{l,m} \\ \varphi_{n0} v_{l,m} \\ a_{p1} b_{n1} v_{l,m} \\ a_{p2} b_{n2} v_{l,m} \end{bmatrix}$$

where the quantity $v_{l,m}$ is a vector related to a beam set, the parameter combination (l, m) may be regarded as an index of the beam, and the quantities $\varphi_{n0}$, $a_{p1}$, $a_{p2}$, $b_{n1}$, $b_{n2}$ are various parameters for control of the beam set. More details for the codebook can be found in 3GPP Release 15 specifications.

In this column of the conventional codebook, the upper two elements $v_{l,m}$ and $\varphi_{n0} v_{l,m}$ represent one panel of a network device, and the lower two elements $a_{p1} b_{n1} v_{l,m}$ and $a_{p2} b_{n2} v_{l,m}$ represent another panel of the network device. This means that the two panels of the network device use the same beam (l, m). The reason is that the two panels of the same network device have the same geographical location, and thus the optimal beams from the two panels for communicating with a same terminal device are identical.

However, in the communication scenario as depicted in FIG. 1 where the terminal device 130 may be in communication with two network devices 110, 120, beams for different panels/antenna groups in different TRPs are usually different. For example, the beam 116 of the network device 110 is an optimal beam for communication with the terminal device 130, whereas the beam 124 of the network device 120 is an optimal beam for communication with the terminal device 130. That is, for different network devices 110, 120, the optimal beams for communication with the terminal device 130 are different. In this event, the traditional codebook may be not suitable for the terminal device 130 to feed back to different network devices 110, 120.

In other words, the conventional codebook design is only for single TRP/panel, while for multi-TRP transmission, if PMI feedback is based on codebook, the current 3GPP specification is not sufficient to support multiple TRPs. Embodiments of the present disclosure provide method and apparatus to design a common framework for initial access of both single and multiple beam based deployments. Particularly, new codebook design is proposed to support a plurality of TRPs, with different beam indices for different TRPs/panels. Also, new codebook design is proposed to support dynamic feedback for a single TRP and multiple TRPs. With the embodiments of the present disclosure, multi-TRP PMI feedback may be based on the proposed multi-TRP codebook. In the following, the proposed multi-TRP codebook and a method for communication based on the proposed multi-TRP codebook will be detailed with reference to FIG. 2.

Figure 2:
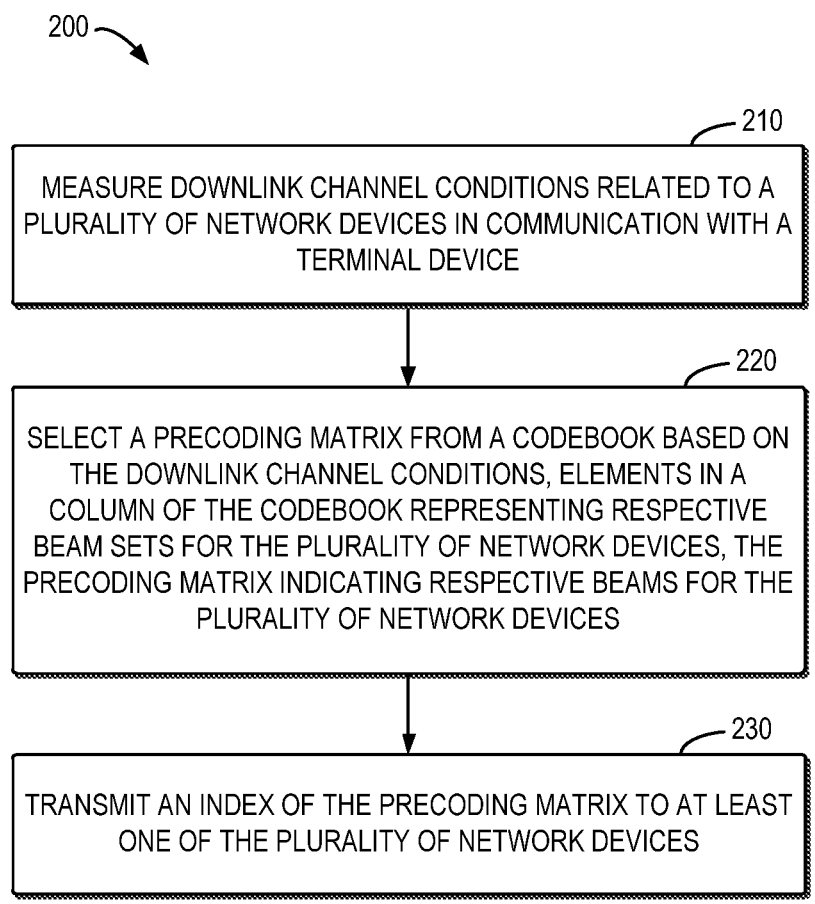
FIG. 2 shows a flowchart of an example method in accordance with some embodiments of the present disclosure.

FIG. 2 shows a flowchart of an example method 200 in accordance with some embodiments of the present disclosure. The method 200 can be implemented at the terminal device 130 as shown in FIG. 1. It is to be understood that the method 200 may include additional blocks not shown and/or may omit some blocks as shown, and the scope of the present disclosure is not limited in this regard.

For the purpose of discussion, the method 200 will be described from the perspective of the terminal device 130 with reference to FIG. 1. Moreover, although the following description may be based on the fact that the terminal device 130 is in communication with two network devices 110, 120, all the embodiments described herein are also applicable to communication scenarios where the terminal device 130 is in communication with three or more network devices.

At block 210, the terminal device 130 measures downlink channel conditions related to a plurality of network devices in communication with the terminal device 130, for example the network devices 110, 120. In some embodiments, the network devices 110, 120 may be two gNBs which collectively serve the terminal device 130 and have communication with each other. In other embodiments, the network devices 110, 120 may be two remote antennas of a same gNB (for example, two TRPs), which are located at different geographical locations. Because the network devices 110, 120 may be located at different geographical locations, the downlink channel conditions related to the network devices 110, 120 may also be different.

As an example, for performing the measurements, the terminal device 130 may detect downlink reference signals transmitted by the network devices 110, 120. The downlink channel conditions related to the network devices 110, 120 may be then determined from the detection of the downlink reference signals, such as the receiving quality of the signals. It is to be understood that the embodiments of the present disclosure are not limited to using downlink reference signals, and other suitable ways to measure the downlink channel conditions related to the network devices 110, 120 may also be possible.

At block 220, the terminal device 130 selects a precoding matrix from a codebook based on the downlink channel conditions. As discussed above, the proposed multi-TRP codebook may include beam information for a plurality of network devices in communication with the terminal device 130, such as network devices 110, 120. To this end, elements in a column of the proposed multi-TRP codebook represent respective beam sets for the plurality of network devices, such as network devices 110, 120. With this codebook design, the precoding matrix selected from the proposed multi-TRP codebook indicates respective beams for the plurality of network devices, such as network devices 110, 120.

In some embodiments, a terminal device may be configured with different parameters for different scenarios, for example, a terminal device may be configured with different codebooks or codebook types for single-TRP/panel transmission or multi-TRP/panel transmission. For example, based on the configured codebook or codebook type, a terminal device will select rank indicator and/or precoding matrix indicator among different sets of codebooks.

In some embodiments, a column of the multi-TRP/panel codebook may be written as below.

$$W_{l,m,l',m'} = \begin{bmatrix} v_{l,m} \\ \alpha \cdot v_{l,m} \\ \beta \cdot v_{l',m'} \\ \gamma \cdot v_{l',m'} \end{bmatrix} \text{ or } W_{l,m,l',m'} = \begin{bmatrix} v_{l,m} \\ \alpha \cdot v_{l,m} \\ \beta \cdot v_{l',m'} \\ \gamma \cdot v_{l',m'} \\ \theta \cdot v_{l,m} \\ \delta \cdot v_{l,m} \\ \mu \cdot v_{l',m'} \\ \omega \cdot v_{l',m'} \end{bmatrix} \text{ or}$$

$$W_{l,m,l',m'} = \begin{bmatrix} v_{l,m} \\ \alpha \cdot v_{l,m} \\ \beta \cdot v_{l,m} \\ \gamma \cdot v_{l,m} \\ \theta \cdot v_{l',m'} \\ \delta \cdot v_{l',m'} \\ \mu \cdot v_{l',m'} \\ \omega \cdot v_{l',m'} \end{bmatrix}$$

where the quantity $v_{l,m}$ is a vector related to a first beam set, and the quantity $v_{l',m'}$ is a vector related to a second beam set, the parameter combination (l, m) and (l', m') may be regarded as indices of two different beams, respectively. For example, the parameter combination (l, m) and (l', m') may be selected independently.

In some embodiments, the quantities α, β, γ, θ, δ, μ, ω are various parameters for control of the beam sets, for example, the quantities α, β, γ, θ, δ, μ, ω may be phase rotation between beam sets. In some embodiments, both of the values of parameter combination (l, m) and (l', m') should be reported from a terminal device to a network device. For example, the values can be jointly encoded or separately encoded. In some embodiments, for the single codebook, there may be two configurations of codebook subset restriction (CBSR). For example, one CBSR is used for restriction of (l, m) and the other CBSR is used for restriction of (l', m').

In some embodiments, a column of the multi-TRP/panel codebook may be written as below.

$$W_{l,m,l',m',l'',m'',l''',m'''} = \begin{bmatrix} v_{l,m} \\ \alpha \cdot v_{l,m} \\ \beta \cdot v_{l',m'} \\ \gamma \cdot v_{l',m'} \\ \theta \cdot v_{l'',m''} \\ \delta \cdot v_{l'',m''} \\ \mu \cdot v_{l''',m'''} \\ \omega \cdot v_{l''',m'''} \end{bmatrix}$$

where the quantity $v_{l,m}$ is a vector related to a first beam set, and the quantity $v_{l',m'}$ is a vector related to a second beam set, and the quantity $v_{l'',m''}$ is a vector related to a third beam set, and the quantity is a vector related to a fourth beam set, the parameter combination (l, m), (l', m'), (l", m") and (l''', m''') may be regarded as indices of four different beams, respectively. For example, the parameter combination (l, m), (l', m'), (l", m") and (l''', m''') may be selected independently.

In some embodiments, the quantities α, β, γ, θ, δ, μ, ω are various parameters for control of the beam sets, for example, the quantities α, β, γ, θ, δ, μ, ω may be phase rotation between beam sets. In some embodiments, all of the values of parameter combination (l, m), (l', m'), (l", m") and (l''', m''') should be reported from a terminal device to a network device. For example, the values can be jointly encoded or separately encoded. In some embodiments, for the single codebook, there may be four configurations of codebook subset restriction (CBSR). For example, the first CBSR is used for restriction of (l, m), the second CBSR is used for restriction of (l', m'), the third CBSR is used for restriction of (l", m"), and the fourth CBSR is used for restriction of (l''', m''').

In some embodiments, the quantities β and/or θ and/or μ are the phase difference between different panels/TRPs. In some embodiments, the number of available values for the quantities β and/or θ and/or μ may be configurable. In some embodiments, for the first configuration, the number of available values for the quantities β and/or θ and/or μ may be 4. For example, the values may be QPSK, or any of {1, j, −1, −j}. And for the second configuration, the number of available values for the quantities β and/or θ and/or μ may be 8. For example, the values may be 8 PSK, or any of $\{e^{j*2\pi*0/8}, e^{j*2\pi*1/8}, e^{j*2\pi*2/8}, e^{j*2\pi*3/8}, e^{j*2\pi*4/8}, e^{j*2\pi*5/8}, e^{j*2\pi*6/8}, e^{j*2\pi*7/8}\}$. In some embodiments, there may be a third configuration, and the number of available values for the quantities β and/or θ and/or μ may be 2. For example, the values may be BPSK, or any of {1,j} or any of {1, −1}.

In some embodiments, for multi-TRP transmission, the number of panels for transmission to a given terminal device from the different TRPs should be same. In some embodiments, for a column of the multi-TRP/panel codebook, the number of quantities including $v_{l,m}$ is same with the number of quantities including $v_{l',m'}$. In some embodiments, for a column of the multi-TRP/panel codebook, the number of quantities including $v_{l,m}$ is same with the number of quantities including $v_{l',m'}$, and same with the number of quantities including $v_{l'',m''}$, and same with the number of quantities including $v_{l''',m'''}$. In one embodiment, the number of panels for multi-TRP codebook can only be one for each TRP. For example, for a column of the multi-TRP/panel codebook, the number of quantities including $v_{l,m}$ is two and the number of quantities including $v_{l',m'}$ is two.

In some embodiments, in the example scenario as depicted in FIG. 1, a column of the proposed multi-TRP codebook for the network devices 110, 120 may be written as below.

$$W_{l,m,l',m',p,n} = \begin{bmatrix} v_{l,m} \\ \varphi_{n0} v_{l,m} \\ a_{p1} b_{n1} v_{l',m'} \\ a_{p2} b_{n2} v_{l',m'} \end{bmatrix}$$

where the quantity $v_{l,m}$ is a vector related to a beam set for the network device 110, the quantity $v_{l',m'}$ is a vector related to another beam set for the network device 120, the parameter combination (l, m) and (l', m') may be regarded as indices of two different beams, respectively, and the quantities $\varphi_{n0}, a_{p1}, a_{p2}, b_{n1}, b_{n2}$ are various parameters for control of the beam sets. More details for these quantities can be found in Release 15 specifications.

Different from the conventional codebook, in the column of the proposed multi-TRP codebook, the upper two elements $v_{l,m}$ and $\varphi_{n0}v_{l,m}$ represent a beam set for one network device of the plurality of the network devices, such as the network device 110, and the lower two elements $a_{p1}b_{n1}v_{l',m'}$ and $a_{p2}b_{p2}v_{l',m'}$ represent another beam set for another network device of the plurality of the network devices, such as the network device 120. In this way, the proposed multi-TRP codebook enables multi-TRP PMI feedback for a plurality of the network devices in communication of a terminal device.

In the communication environment 100, the power for CSI-RS resources for different network devices (such as the network devices 110, 120) may be different, and/or the path loss for different links may be different. Also, the number of panels in different network devices may be different. Then, even the power for CSI-RS resource transmission from different network devices are same, the transmitted power from different panels may be different. For example, the network device 110 has one panel (8 ports), and the network device 120 has two panels (total 16 ports). If only one panel from each network device can be transmitted, the power from the network device 110 may be P, and the power from the network device 120 may be only P/2.

In some embodiments, power parameters may be introduced for different network devices, so as to take account into the above discussed power differences. In these embodiments, different beams are included in the proposed multi-TRP codebook, and the beam index reporting may be wideband. To be more specific, in order to control power of the respective beam sets for a plurality of the network devices, the elements in the column of the proposed multi-TRP codebook may include a first element representing a reference beam set. In addition, there may be a second element comprising a power parameter representing a ratio of power for a respective beam set to power for the reference beam set. In this way, the power differences among the plurality of network devices may be reduced or eliminated.

In some embodiments, a column of the multi-TRP/panel codebook may be written as below.

$$W_{l,m,l',m'} = \begin{bmatrix} v_{l,m} \\ \alpha \cdot v_{l,m} \\ c \cdot \beta \cdot v_{l',m'} \\ c \cdot \gamma \cdot v_{l',m'} \end{bmatrix} \text{ or } W_{l,m,l',m'} = \begin{bmatrix} v_{l,m} \\ \alpha \cdot v_{l,m} \\ c \cdot \beta \cdot v_{l',m'} \\ c \cdot \gamma \cdot v_{l',m'} \\ \theta \cdot v_{l,m} \\ \delta \cdot v_{l,m} \\ c \cdot \mu \cdot v_{l',m'} \\ c \cdot \omega \cdot v_{l',m'} \end{bmatrix} \text{ or }$$

$$W_{l,m,l',m'} = \begin{bmatrix} v_{l,m} \\ \alpha \cdot v_{l,m} \\ \beta \cdot v_{l,m} \\ \gamma \cdot v_{l,m} \\ c \cdot \theta \cdot v_{l',m'} \\ c \cdot \delta \cdot v_{l',m'} \\ c \cdot \mu \cdot v_{l',m'} \\ c \cdot \omega \cdot v_{l',m'} \end{bmatrix}$$

where the quantity $v_{l,m}$ is a vector related to a first beam set, and the quantity $v_{l',m'}$ is a vector related to a second beam set, the parameter combination (l, m) and (l', m') may be regarded as indices of two different beams, respectively. For example, the parameter combination (l, m) and (l', m') may be selected independently.

In some embodiments, the quantity c is a parameter for power ratio for the second beam set. For example, the available value for c may be at least one of $\{1, \sqrt{1/2}, \sqrt{1/4}, \sqrt{1/8}, \sqrt{1/16}, \sqrt{1/32}, \sqrt{1/64}, 0\}$ or at least one of $\{1, \sqrt{1/2}, \sqrt{1/4}, 0\}$. In some embodiments, the quantities $\alpha, \beta, \gamma, \theta, \delta, \mu, \omega$ are various parameters for control of the beam sets, for example, the quantities $\alpha, \beta, \gamma, \theta, \delta, \mu, \omega$ may be phase rotation between beam sets. In some embodiments, both of the values of parameter combination (l, m) and (l', m') should be reported from a terminal device to a network device. For example, the values can be jointly encoded or separately encoded.

In some embodiments, a column of the multi-TRP/panel codebook may be written as below.

$$W_{l,m,l',m',l'',m'',l''',m'''} = \begin{bmatrix} v_{l,m} \\ \alpha \cdot v_{l,m} \\ c_1 \cdot \beta \cdot v_{l',m'} \\ c_1 \cdot \gamma \cdot v_{l',m'} \\ c_2 \cdot \theta \cdot v_{l'',m''} \\ c_2 \cdot \delta \cdot v_{l'',m''} \\ c_3 \cdot \mu \cdot v_{l''',m'''} \\ c_3 \cdot \omega \cdot v_{l''',m'''} \end{bmatrix}$$

where the quantity $v_{l,m}$ is a vector related to a first beam set, and the quantity $v_{l',m'}$ is a vector related to a second beam set, and the quantity $v_{l'',m''}$ is a vector related to a third beam set, and the quantity $v_{l''',m'''}$ is a vector related to a fourth beam set, the parameter combination (l, m), (l', m'), (l'',m'') and (l''', m''') may be regarded as indices of four different beams, respectively. For example, the parameter combination (l, m), (l', m'), (l'', m'') and (l''', m''') may be selected independently.

In some embodiments, the quantities $c_1, c_2, c_3$ are parameters for power ratio for the second beam set, the third beam set, the fourth beam set, respectively. For example, the available value for any of $c_1, c_2, c_3$ may be at least one of $\{1, \sqrt{1/2}, \sqrt{1/4}, \sqrt{1/8}, \sqrt{1/16}, \sqrt{1/32}, \sqrt{1/64}, 0\}$ or at least one of $\{1, \sqrt{1/2}, \sqrt{1/4}, 0\}$. In some embodiments, the quantities $\alpha, \beta, \gamma, \theta, \delta, \mu, \omega$ are various parameters for control of the beam sets, for example, the quantities $\alpha, \beta, \gamma, \theta, \delta, \mu, \omega$ may be phase rotation between beam sets. In some embodiments, all of the values of parameter combination (l, m), (l, m'), (l", m") and (l''', m''') should be reported from a terminal device to a network device. For example, the values can be jointly encoded or separately encoded.

For example, with this power parameter, a column of the proposed multi-TRP codebook for the network devices 110, 120 may be written as below.

$$W_{l,m,l',m',p,n,q} = \begin{bmatrix} v_{l,m} \\ \varphi_{n0} v_{l,m} \\ c_q a_{p1} b_{n1} v_{l',m'} \\ c_q a_{p2} b_{n2} v_{l',m'} \end{bmatrix}$$

where the quantity $v_{l,m}$ is a vector related to a beam set for the network device 110, the quantity $v_{l',m'}$ is a vector related to another beam set for the network device 120, the parameter combination (l, m) and (l', m') may be regarded as indices of two different beams, respectively, and the quantities $\varphi_{n0}, a_{p1}, a_{p2}, b_{n1}, b_{n2}$ are various parameters for control of the beam sets. More details for these quantities can be found in Release 15 specifications.

Analogous to the above, the upper two elements $v_{l,m}$ and $\varphi_{n0} v_{l,m}$ may represent the beam set for the network device 110, and the lower two elements $c_q a_{p1} b_{n1} v_{l',m'}$ and $c_q a_{p2} b_{n2} v_{l',m'}$ may represent another beam set for the network device 120. In addition, in this example, the power parameter $c_q$ may be included in the lower two elements for the network device 120, which represents a ratio of the power for the beam set for the network device 120 to the power for the beam set for the network device 110. That is, the beam set for the network device 110 is used as the reference beam set.

In some embodiments, dynamic network device selection can be supported by the proposed multi-TRP codebook. Also, in these embodiments, different beams are included in the proposed multi-TRP codebook, and the beam index reporting may be wideband. In order to realize the dynamic selection of the plurality of network devices, one or more element in the column of the proposed multi-TRP codebook may comprise a control parameter for enabling or disabling a respective one of the plurality of network devices. In this way, the terminal device 130 may readily select the desirable network devices to communicate with, through the proposed multi-TRP codebook.

In some embodiments, a column of the multi-TRP/panel codebook may be written as below.

$$W_{l,m,l',m'} = \begin{bmatrix} d \cdot v_{l,m} \\ d \cdot \alpha \cdot v_{l,m} \\ c \cdot \beta \cdot v_{l',m'} \\ c \cdot \gamma \cdot v_{l',m'} \end{bmatrix} \text{ or } W_{l,m,l',m'} = \begin{bmatrix} d \cdot v_{l,m} \\ d \cdot \alpha \cdot v_{l,m} \\ c \cdot \beta \cdot v_{l',m'} \\ c \cdot \gamma \cdot v_{l',m'} \\ d \cdot \theta \cdot v_{l,m} \\ d \cdot \delta \cdot v_{l,m} \\ c \cdot \mu \cdot v_{l',m'} \\ c \cdot \omega \cdot v_{l',m'} \end{bmatrix} \text{ or}$$

-continued $$W_{l,m,l',m'} = \begin{bmatrix} d \cdot v_{l,m} \\ d \cdot \alpha \cdot v_{l,m} \\ d \cdot \beta \cdot v_{l,m} \\ d \cdot \gamma \cdot v_{l,m} \\ c \cdot \theta \cdot v_{l',m'} \\ c \cdot \delta \cdot v_{l',m'} \\ c \cdot \mu \cdot v_{l',m'} \\ c \cdot \omega \cdot v_{l',m'} \end{bmatrix}$$

where the quantity $v_{l,m}$ is a vector related to a first beam set, and the quantity $v_{l',m'}$ is a vector related to a second beam set, the parameter combination (l, m) and (l', m') may be regarded as indices of two different beams, respectively. For example, the parameter combination (l, m) and (l', m') may be selected independently.

In some embodiments, the quantity d is a parameter for power indication for the first beam set. For example, the available value for d may be at least one of $\{1, \sqrt{1/2}, \sqrt{1/4}, \sqrt{1/8}, \sqrt{1/16}, \sqrt{1/32}, \sqrt{1/64}, 0\}$ or at least one of $\{1, \sqrt{1/2}, \sqrt{1/4}, 0\}$. In some embodiments, the quantity c is a parameter for power ratio for the second beam set. For example, the available value for c may be at least one of $\{1, \sqrt{1/2}, \sqrt{1/4}, \sqrt{1/8}, \sqrt{1/16}, \sqrt{1/32}, \sqrt{1/64}, 0\}$ or at least one of $\{1, \sqrt{1/2}, \sqrt{1/4}, 0\}$.

In some embodiments, the number of available values for the quantity d may be different from the number of available values for the quantity c. For example, the number of available values for the quantity d may be less than the number of values for the quantity c. In some embodiments, at least one of the values for quantity c may be different from any of the available value for quantity d. In some embodiments, the number of values and/or the value for the quantity c may be dependent on different values of quantity d.

In some embodiments, the available values for d may be at least one of $\{0, 1\}$ or at least one of $\{1, \sqrt{1/2}, \sqrt{1/4}, 0\}$. In some embodiments, when the value for quantity d is 0, the number of values for quantity c is only 1. In some embodiments, when the value for quantity d is 0, the available value for quantity c is 1. In some embodiments, when the value for quantity d is not 0, for example, the value for quantity for d is 1, the number of values for quantity c is larger than 1, for example, 2 or 4 or 8. In some embodiments, when the value for quantity d is not 0, for example, the value for quantity for d is 1, the available value for quantity c is at least one of $\{1, \sqrt{1/2}, \sqrt{1/4}, \sqrt{1/8}, \sqrt{1/16}, \sqrt{1/32}, \sqrt{1/64}, 0\}$ or at least one of $\{1, \sqrt{1/2}, \sqrt{1/4}, 0\}$.

In some embodiments, the quantities $\alpha, \beta, \gamma, \theta, \delta, \mu, \omega$ are various parameters for control of the beam sets, for example, the quantities $\alpha, \beta, \gamma, \theta, \delta, \mu, \omega$ may be phase rotation between beam sets. In some embodiments, both of the values of parameter combination (l, m) and (l', m') should be reported from a terminal device to a network device. For example, the values can be jointly encoded or separately encoded.

In some embodiments, the value of quantity d for the power indicator of the first beam, and the value of quantity c for the power ratio of the second beam should be reported from a terminal device to a network device. For example, the values can be jointly encoded or separately encoded. In some embodiments, the number of bits for reporting of the quantity d may be different from the number of bits for reporting of quantity c. For example, the number of bits for reporting of quantity d may be less than the number of bits for reporting of quantity c. For example, the number of bits for reporting the quantity d may be 1. For another example, the number of bits for reporting the quantity c may be 2 or 3 or 4.

In some embodiments, the number of bits for reporting of the quantity c may be dependent on the reported value of quantity d. In some embodiments, the number of bits for reporting of the quantity c may be different for different reported values of quantity d. In one embodiment, if the reported value of quantity d is 0, there may be no need of reporting the quantity c. In another embodiment, if the reported value of quantity d is not 0, for example, the reported value of quantity d is 1, the number of bits for reporting of quantity c may be 2 or 3 or 4.

In some embodiments, a column of the multi-TRP/panel codebook may be written as below.

$$W_{l,m,l',m',l'',m'',l''',m'''} = \begin{bmatrix} v_{l,m} \\ \alpha \cdot v_{l,m} \\ c_1 \cdot \beta \cdot v_{l',m'} \\ c_1 \cdot \gamma \cdot v_{l',m'} \\ c_2 \cdot \theta \cdot v_{l'',m''} \\ c_2 \cdot \delta \cdot v_{l'',m''} \\ c_3 \cdot \mu \cdot v_{l''',m'''} \\ c_3 \cdot \omega \cdot v_{l''',m'''} \end{bmatrix}$$

where the quantity $v_{l,m}$ is a vector related to a first beam set, and the quantity $v_{l',m'}$ is a vector related to a second beam set, and the quantity is a vector related to a third beam set, and the quantity $v_{l''',m'''}$ is a vector related to a fourth beam set, the parameter combination (l, m), (l', m'), (l'', m'') and (l''', m''') may be regarded as indices of four different beams, respectively. For example, the parameter combination (l, m), (l', m'), (l'', m'') and (l''', m''') may be selected independently.

In some embodiments, the quantity d is a parameter for power indication for the first beam set. For example, the available value for d may be at least one of $\{1, \sqrt{1/2}, \sqrt{1/4}, \sqrt{1/8}, \sqrt{1/16}, \sqrt{1/32}, \sqrt{1/64}, 0\}$ or at least one of $\{1, \sqrt{1/2}, \sqrt{1/4}, 0\}$. In some embodiments, the quantities $c_1, c_2, c_3$ are parameters for power ratio for the second beam set, the third beam set, the fourth beam set, respectively. For example, the available value for any of $c_1, c_2, c_3$ may be at least one of $\{1, \sqrt{1/2}, \sqrt{1/4}, \sqrt{1/8}, \sqrt{1/16}, \sqrt{1/32}, \sqrt{1/64}, 0\}$ or at least one of $\{1, \sqrt{1/2}, \sqrt{1/4}, 0\}$.

In some embodiments, the quantities $\alpha, \beta, \gamma, \theta, \delta, \mu, \omega$ are various parameters for control of the beam sets, for example, the quantities $\alpha, \beta, \gamma, \theta, \delta, \mu, \omega$ may be phase rotation between beam sets. In some embodiments, all of the values of parameter combination (l, m), (l', m'), (l'', m'') and (l''', m''') should be reported from a terminal device to a network device. For example, the values can be jointly encoded or separately encoded.

In some embodiments, the number of available values for the quantity d may be different from the number of available values for each of the quantities $c_1, c_2, c_3$. For example, the number of available values for the quantity d may be less than the number of values for each of the quantities $c_1, c_2, c_3$. In some embodiments, at least one of the values for each of the quantities $c_1, c_2, c_3$ may be different from any of the available value for quantity d. In some embodiments, the number of values and/or the value for each of the quantities $c_1, c_2, c_3$ may be dependent on different values of quantity d.

In some embodiments, the available values for d may be at least one of $\{0, 1\}$ or at least one of $\{1, \sqrt{1/2}, \sqrt{1/4}, 0\}$. In some embodiments, when the value for quantity d is 0, the number of values for each of the quantities $c_1, c_2, c_3$ is only 1. In some embodiments, when the value for quantity d is 0, the available value for any of the quantities $c_1, c_2, c_3$ is 1. In some embodiments, when the value for quantity d is not 0, for example, the value for quantity for d is 1, the number of values for each of the quantities $c_1, c_2, c_3$ is larger than 1, for example, 2 or 4 or 8. In some embodiments, when the value for quantity d is not 0, for example, the value for quantity for d is 1, the available value for each of the quantities $c_1, c_2, c_3$ is at least one of $\{1, \sqrt{1/2}, \sqrt{1/4}, \sqrt{1/8}, \sqrt{1/16}, \sqrt{1/32}, \sqrt{1/64}, 0\}$ or at least one of $\{1, \sqrt{1/2}, \sqrt{1/4}, 0\}$.

In some embodiments, the value of quantity d for the power indicator of the first beam, and the values of each of the quantities $c_1, c_2, c_3$ for the power ratio of the second beam should be reported from a terminal device to a network device. For example, the values can be jointly encoded or separately encoded. In some embodiments, the number of bits for reporting of the quantity d may be different from the number of bits for reporting of each of the quantities $c_1, c_2, c_3$. For example, the number of bits for reporting of quantity d may be less than the number of bits for reporting of each of the quantities $c_1, c_2, c_3$. For example, the number of bits for reporting the quantity d may be 1. For another example, the number of bits for reporting each of the quantities $c_1, c_2, c_3$ may be 2 or 3 or 4.

In some embodiments, the number of bits for reporting of each of the quantities $c_1, c_2, c_3$ c may be dependent on the reported value of quantity d. In some embodiments, the number of bits for reporting of each of the quantities $c_1, c_2, c_3$ may be different for different reported values of quantity d. In one embodiment, if the reported value of quantity d is 0, there may be no need of reporting any of the quantities $c_1, c_2, c_3$. In another embodiment, if the reported value of quantity d is not 0, for example, the reported value of quantity d is 1, the number of bits for reporting of each of the quantities $c_1, c_2, c_3$ may be 2 or 3 or 4.

For example, with this control parameter, a column of the proposed multi-TRP codebook for the network devices 110, 120 may be written as below.

$$W_{l,m,l',m',p,n,q} = \begin{bmatrix} d_q v_{l,m} \\ d_q \varphi_{n0} v_{l,m} \\ a_{p1} b_{n1} v_{l',m'} \\ a_{p2} b_{n2} v_{l',m'} \end{bmatrix}$$

where the quantity $v_{l,m}$ is a vector related to a beam set for the network device 110, the quantity $v_{l',m'}$ is a vector related to another beam set for the network device 120, the parameter combination (l, m) and (l', m') may be regarded as indices of two different beams, respectively, and the quantities $\varphi_{n0}, a_{p1}, a_{p2}, b_{n1}, b_{n2}$ are various parameters for control of the beam sets. More details for these quantities can be found in Release 15 specifications.

Analogous to the above, the upper two elements $d_q v_{l,m}$ and $d_q \varphi_{n0} v_{l,m}$ may represent the beam set for the network device 110, and the lower two elements $a_{p1} b_{n1} v_{l',m'}$ and $a_{p2} b_{p2} v_{l',m'}$ may represent another beam set for the network device 120. In addition, in this example, the power parameter $d_q$ may be included in the upper two elements for the network device 110, which enables or disables the network device 110. For example, when $d_q = 1$, the network device 110 is enabled by the terminal device 130 for the communication with the terminal device 130, whereas when $d_q=0$, the network device 110 is disabled by the terminal device 130 for the communication with the terminal device 130. The control parameter $d_q$ may also be included for other network devices.

In some embodiments, the power parameters for different network devices and the dynamic network device selection may be combined. In other words, the above discussed power parameter $c_q$ and the control parameter $d_q$ may both be included in the proposed multi-TRP codebook. For example, a column of the proposed multi-TRP codebook for the network devices 110, 120, including both $c_q$ and $d_q$, may be written as below.

$$W_{l,m,l',m',p,n,q} = \begin{bmatrix} d_q v_{l,m} \\ d_q \varphi_{n0} v_{l,m} \\ c_q a_{p1} b_{n1} v_{l',m'} \\ c_q a_{p2} b_{n2} v_{l',m'} \end{bmatrix}$$

where the quantity $v_{l,m}$ is a vector related to a beam set for the network device 110, the quantity $v_{l',m'}$ is a vector related to another beam set for the network device 120, the parameter combination (l, m) and (l', m') may be regarded as indices of two different beams, respectively, and the quantities $\varphi_{n0}, a_{p1}, a_{p2}, b_{n1}, b_{n2}$ are various parameters for control of the beam sets. More details for these quantities can be found in Release 15 specifications.

In some embodiments, the control parameter $d_q$ can be 0 or 1. If $d_q=1$, that means the network device with associated CSI-RS is selected, and the power parameter $c_q$ can be selected from the set of $\{1, \sqrt{1/2}, \sqrt{1/4}, \sqrt{1/8}, \sqrt{1/16}, \sqrt{1/32}, \sqrt{1/64}, 0\}$ or $\{1, \sqrt{1/2}, \sqrt{1/4}, 0\}$ or $\{0,1\}$, and when $c_q=0$, that means the network device with associated CSI-RS is not selected. If $d_q=0$, that means the network device with associated CSI-RS is not selected, and $c_q$ can only be 1.

In some cases, it is desirable for the network devices 110, 120 and the terminal device 130 to use different codebook sizes for different communication scenarios. A convenient way to support different codebook sizes is to use a large codebook with many elements by default and apply a codebook subset restriction in the scenarios where a smaller codebook is beneficial. With the codebook subset restriction, a subset of the precoding matrices in the codebook is restricted so that the terminal device 130 has a smaller set of possible precoding matrices to choose from. This effectively reduces the size of the codebook, implying that the search for the best PMI can be done on the smaller unrestricted set of precoding matrices, thereby also reducing computational requirements for the terminal device 130 for this particular search.

Typically, any or both of the network devices 110, 120 would signal the codebook subset restriction to the terminal device 130 by means of a bitmap, one bit for each precoding matrix in the codebook, where a 1 would indicate that the precoding matrix is restricted (meaning that the terminal device 130 is not allowed to choose and report said precoding matrix). Thus, for a codebook with N elements, a bitmap of length N would be used to signal the codebook subset restriction. This allows for full flexibility for the network devices 110, 120 to restrict every possible subset of the codebook.

For the proposed multi-TRP codebook, since the elements in a column of the codebook represent respective beam sets for the plurality of network devices in communication with the terminal device 130, a plurality of sets of codebook subset restrictions may be provided for a single codebook, namely, for different network devices within the proposed multi-TRP codebook. That is, for multi-TRP transmission, the beams from different network devices are different, so a plurality of sets of codebook subset restrictions may be configured for the proposed multi-TRP codebook.

In this event, for the example scenario as depicted in FIG. 1, when selecting the precoding matrix from the proposed multi-TRP codebook, the terminal device 130 may exclude a first beam subset from the beam set for the network device 110, and also exclude a second beam subset from the beam set for the network device 120. In some embodiments, the first beam subset may be different from the second beam subset. In other embodiments, the first and second beam subsets may be the same. In this way, different codebook subset restrictions may be applied to respective beam sets for different network devices according to their respective communication properties.

In some embodiments, one or more beam combinations may be limited for the plurality of the network devices in communication with the terminal device 130, such as for the network device 110, 120. That is, some beam combinations may not be supported for the plurality of the network devices. For example, combination of multiple sets of codebook subset restrictions may be configured for the plurality of the network devices. In this event, when selecting the precoding matrix from the proposed multi-TRP codebook, the terminal device 130 may exclude a predetermined beam combination of respective beams for the plurality of network devices, such as the network devices 110, 120.

Alternatively or additionally, report of beam indices may be based on combination of the plurality of network devices. In addition, the bit field can be based on the codebook subset restriction. For example, if a codebook subset restriction is applied for one beam set, only one or several offset values relative to the codebook subset restriction may be applied for another beam set. In this way, the resources for transmitting the codebook subset restrictions may be reduced.

In other embodiments, a restricted beam combination may be determined by determining a first beam index from a first beam set for one network device, and determining other beam indices for other network devices based on one or several offset values. For example, for the example scenario as depicted in FIG. 1, if the beam with an index1 is restricted for the network device 110, the beam with an index of index1+offset is restricted for the network device 120.

In this event, when selecting the precoding matrix from the proposed multi-TRP codebook, the terminal device 130 may exclude a first beam index for a first network device of the plurality of network devices, and also exclude a second beam index for a second network device of the plurality of network devices, based on the first beam index and an offset between the first beam index and the second beam index. In this way, the resources for transmitting the codebook subset restrictions may also be reduced.

In some embodiments, for selecting the precoding matrix from the proposed multi-TRP codebook, the terminal device 130 may first determine a group of beams for a network device of the plurality of network devices (for example, the network device 110), and then combine a plurality of beams in the group of beams to form a combined beam for the network device. In other words, the final beam for the network device 110 is a combined beam of at least two beams in the beam group. In this way, a combined beam with advantages from a plurality of beams may be obtained for a network device.

In some embodiments, only 2 layers may be supported in this type II codebook for multi-TRP, and two sets of beams (each set with 2 beams) may be selected. The two beams are combined within each set. It is to be understood that the particular number of layers is only an example, and any other suitable number of layers may be supported in other embodiments, At block 230, the terminal device 130 transmits an index of the precoding matrix (PMI) to at least one of the plurality of network devices. For example, in the example scenario as depicted in FIG. 1, the terminal device 130 may transmits the PMI to either or both of the network device 110, 120. If the network device 110, 120 are two gNBs/TRPs and the PMI is transmitted to the network device 110, the PMI may be transmitted from the network device 110 to the network device 120 via the communication link between them.

In some embodiments, the reporting of the precoding matrix index including a plurality of beam indices for a plurality of network devices is wideband. In other embodiments, the reporting may also be narrowband. In some embodiments, 4 ports, 8 ports, 16 ports and 32 ports may be supported by the proposed multi-TRP codebook. It is understood that these particular numbers of ports are only examples, and any other suitable number of the ports may be supported in other embodiments.

In some embodiments, a beam index for one network device of the plurality of network devices is reported, and another beam index for another network device of the plurality of network device may be based on an offset between the two beam indices. For example, the terminal device 130 may transmit a first beam index for the network device 110, and also transmit an offset between the first beam index and a second beam index for the network device 120. In this way, the resources for reporting the precoding matrix index may be reduced.

In some embodiments, the reporting of the precoding matrix index may be divided into two steps. In a first step, a beam group is reported for the plurality of network devices. In a second step, beam indices from the beam group are reported, and the beam indices are one to one for the plurality of network devices. For example, the terminal device 130 may transmit a group index of a group of beams for both the network devices 110, 120, and also transmit respective beam indices of the group of beams for the network devices 110, 120. In this way, the resources for reporting the precoding matrix index may be also reduced.

Figure 3:
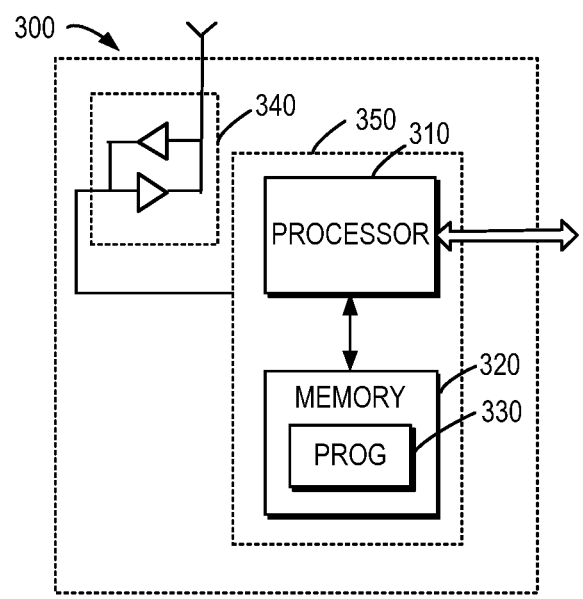
FIG. 3 is a simplified block diagram of a device that is suitable for implementing embodiments of the present disclosure.

FIG. 3 is a simplified block diagram of a device 300 that is suitable for implementing embodiments of the present disclosure. The device 300 can be considered as a further example embodiment of the terminal device 130 as shown in FIG. 1. Accordingly, the device 300 can be implemented at or as at least a part of the terminal device 130.

As shown, the device 300 includes a processor 310, a memory 320 coupled to the processor 310, a suitable transmitter (TX) and receiver (RX) 340 coupled to the processor 310, and a communication interface coupled to the TX/RX 340. The memory 320 stores at least a part of a program 330. The TX/RX 340 is for bidirectional communications. The TX/RX 340 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 330 is assumed to include program instructions that, when executed by the associated processor 310, enable the device 300 to operate in accordance with the embodiments of the present disclosure, as discussed herein with reference to FIG. 2. The embodiments herein may be implemented by computer software executable by the processor 310 of the device 300, or by hardware, or by a combination of software and hardware. The processor 310 may be configured to implement various embodiments of the present disclosure. Furthermore, a combination of the processor 310 and memory 320 may form processing means 350 adapted to implement various embodiments of the present disclosure.

The memory 320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 320 is shown in the device 300, there may be several physically distinct memory modules in the device 300. The processor 310 may be of any type suitable to the local technical network, and may include one or more of general purpose computers, special purpose computers, microprocessors, digital signal processors (DSPs) and processors based on multicore processor architecture, as non-limiting examples. The device 300 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 3 and 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication, comprising:
   measuring downlink channel conditions related to a plurality of network devices in communication with a terminal device;
   selecting a precoding matrix from a codebook based on the downlink channel conditions, elements in a column of the codebook representing respective beam sets for the plurality of network devices, the precoding matrix indicating respective beams for the plurality of network devices; and
   transmitting an index of the precoding matrix to at least one of the plurality of network devices.

2. The method of claim 1, wherein transmitting the index of the precoding matrix comprises:
   transmitting a first beam index for a first network device of the plurality of network devices; and
   transmitting an offset between the first beam index and a second beam index for a second network device of the plurality of network devices.

3. The method of claim 1, wherein transmitting the index of the precoding matrix comprises:
   transmitting a group index of a group of beams; and
   transmitting beam indices of the group of beams for the plurality of network devices.

4. The method of claim 1, wherein the elements in the column of the codebook comprise:
   a first element representing a reference beam set, and
   a second element comprising a power parameter representing a ratio of power for a respective beam set to power for the reference beam set.

5. The method of claim 1, wherein at least one of the elements in the column of the codebook comprises a control parameter for enabling or disabling a respective one of the plurality of network devices.

6. The method of claim 1, wherein selecting the precoding matrix comprises:
   excluding a first beam subset from a first beam set of the respective beam sets for the plurality of network devices; and
   excluding a second beam subset from a second beam set of the respective beam sets for the plurality of network devices.

7. The method of claim 1, wherein selecting the precoding matrix comprises:
   excluding a predetermined beam combination of respective beams for the plurality of network devices.

8. The method of claim 1, wherein selecting the precoding matrix comprises:
   excluding a first beam index for a first network device of the plurality of network devices; and
   excluding a second beam index for a second network device of the plurality of network devices, based on the first beam index and an offset between the first beam index and the second beam index.

9. The method of claim 1, wherein selecting the precoding matrix comprises:
   determining a group of beams for a network device of the plurality of network devices; and
   combining a plurality of beams in the group of beams to form a combined beam for the network device.

10. A terminal device, comprising:
a processor; and
a memory storing instructions,
the memory and the instructions being configured, with the processor, to cause the terminal device to:
measure downlink channel conditions related to a plurality of network devices in communication with a terminal device;
select a precoding matrix from a codebook based on the downlink channel conditions, elements in a column of the codebook representing respective beam sets for the plurality of network devices, the precoding matrix indicating respective beams for the plurality of network devices; and
transmit an index of the precoding matrix to at least one of the plurality of network devices.

11. The terminal device of claim 10, wherein the memory and the instructions are further configured, with the processor, to cause the terminal device to:
transmit a first beam index for a first network device of the plurality of network devices; and
transmit an offset between the first beam index and a second beam index for a second network device of the plurality of network devices.

12. The terminal device of claim 10, wherein the memory and the instructions are further configured, with the processor, to cause the terminal device to:
transmit a group index of a group of beams; and
transmit beam indices of the group of beams for the plurality of network devices.

13. The terminal device of claim 10, wherein the elements in the column of the codebook comprise:
a first element representing a reference beam set, and
a second element comprising a power parameter representing a ratio of power for a respective beam set to power for the reference beam set.

14. The terminal device of claim 10, wherein at least one of the elements in the column of the codebook comprises a control parameter for enabling or disabling a respective one of the plurality of network devices.

15. The terminal device of claim 10, wherein the memory and the instructions are further configured, with the processor, to cause the terminal device to:
exclude a first beam subset from a first beam set of the respective beam sets for the plurality of network devices; and
exclude a second beam subset from a second beam set of the respective beam sets for the plurality of network devices.

16. The terminal device of claim 10, wherein the memory and the instructions are further configured, with the processor, to cause the terminal device to:
exclude a predetermined beam combination of respective beams for the plurality of network devices.

17. The terminal device of claim 10, wherein the memory and the instructions are further configured, with the processor, to cause the terminal device to:
exclude a first beam index for a first network device of the plurality of network devices; and
exclude a second beam index for a second network device of the plurality of network devices, based on the first beam index and an offset between the first beam index and the second beam index.

18. The terminal device of claim 10, wherein the memory and the instructions are further configured, with the processor, to cause the terminal device to:
determine a group of beams for a network device of the plurality of network devices; and
combine a plurality of beams in the group of beams to form a combined beam for the network device.

19. A non-transitory computer readable medium having instructions stored thereon, the instructions, when executed on at least one processor of a device, causing the device to perform act comprising:
measuring downlink channel conditions related to a plurality of network devices in communication with a terminal device;
selecting a precoding matrix from a codebook based on the downlink channel conditions, elements in a column of the codebook representing respective beam sets for the plurality of network devices, the precoding matrix indicating respective beams for the plurality of network devices; and
transmitting an index of the precoding matrix to at least one of the plurality of network devices.

20. The non-transitory computer readable medium of claim 19, wherein transmitting the index of the precoding matrix comprises:
transmitting a first beam index for a first network device of the plurality of network devices; and
transmitting an offset between the first beam index and a second beam index for a second network device of the plurality of network devices.

* * * * *